US009977706B2

United States Patent
Korotaev et al.

(10) Patent No.: US 9,977,706 B2
(45) Date of Patent: May 22, 2018

(54) SYSTEM AND METHOD OF VALIDATING DATA FOR INCREMENTAL FORMAT OF BACKUP ARCHIVE

(71) Applicant: Acronis International GmbH, Schaffhausen (CH)

(72) Inventors: Kirill Korotaev, Dolgoprudny (RU); Stanislav Protasov, Moscow (RU); Serguei Beloussov, Singapore (SG); Mark Smulevich, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 60 days.

(21) Appl. No.: 15/137,407

(22) Filed: Apr. 25, 2016

(65) Prior Publication Data

US 2017/0308420 A1    Oct. 26, 2017

(51) Int. Cl.
| | |
|---|---|
| *G06F 11/00* | (2006.01) |
| *G06F 11/07* | (2006.01) |
| *G06F 11/14* | (2006.01) |

(52) U.S. Cl.
CPC ........ *G06F 11/079* (2013.01); *G06F 11/0751* (2013.01); *G06F 11/1451* (2013.01); *G06F 2201/805* (2013.01); *G06F 2201/84* (2013.01)

(58) Field of Classification Search
CPC ............... G06F 11/079; G06F 11/0751; G06F 11/1451; G06F 11/0793; G06F 11/1004; G06F 11/1407; G06F 11/1446; G06F 11/1448; G06F 11/1453; G06F 11/1458; G06F 11/1461; G06F 11/1464; G06F 11/1466; G06F 11/1469; G06F 11/1471; G06F 11/1474; G06F 2001/805; G06F 2201/84
See application file for complete search history.

(56) References Cited

U.S. PATENT DOCUMENTS

| | | | | |
|---|---|---|---|---|
| 8,918,606 B1* | 12/2014 | Stringham | .......... | G06F 12/0223 711/162 |
| 9,235,480 B1* | 1/2016 | Stringham | .......... | G06F 12/0223 |
| 2007/0186066 A1* | 8/2007 | Desai | .................. | G06F 11/1448 711/162 |
| 2007/0186127 A1* | 8/2007 | Desai | .................. | G06F 11/1448 714/13 |
| 2013/0166862 A1* | 6/2013 | Huang | ................ | G06F 11/1451 711/162 |

* cited by examiner

*Primary Examiner* — Bryce P Bonzo
*Assistant Examiner* — Anthony J Amoroso
(74) *Attorney, Agent, or Firm* — Arent Fox LLP; Michael Fainberg

(57) ABSTRACT

A system and method is provided for partially validating data archive for an incremental data backup scheme. According to one aspect, the method includes generating the backup data file of electronic data stored electronic memory by transferring the electronic data to a data storage, generating initial incremental backup data of the electronic data where the incremental backup data includes changes made to the electronic data after the backup data file is generated, and comparing a first portion of the backup data file with a corresponding first portion of the electronic data during the generating of the incremental backup data. Furthermore, the method includes determining whether the first portion of the backup data file is valid based on the comparison and, if the first portion of the backup data file is invalid, generating another backup of the first portion of the electronic data.

21 Claims, 9 Drawing Sheets

SYSTEM AND METHOD OF VALIDATING DATA FOR INCREMENTAL FORMAT OF BACKUP ARCHIVE

FIELD OF TECHNOLOGY

The present disclosure generally relates to the field of electronic data storage and management, and, more specifically, to a system and method for partially validating data archive for incremental format of backup archive.

BACKGROUND

As the number of computer applications and services continues to increase, the amount of electronic content, applications and services used by individuals, enterprises, and the like also continues to rise significantly. Moreover, continuing advances in storage technology provide significant amounts of digital data to be stored cheaply and efficiently. However, this means that significant amounts of data can be lost in the event of a failure or catastrophe. Accordingly, data backup of original data is a critical component of computer-based systems. The original data typically resides on a hard drive, or on an array of hard drives, but may also reside on other forms of storage media, such as solid state memory. Data backups are critical for several reasons, including disaster recovery, restoring data lost due to storage media failure, recovering accidentally deleted data, and repairing corrupted data resulting from malfunctioning or malicious software.

Typically, it can take a significant amount of time, from several hours to several days, for data backup systems to perform an initial "full backup". This is because the amount of information can generally be hundreds of gigabytes to several terabytes. Therefore, many data backup systems will use incremental data backup in between when full backups of the target data are generated. Typically, incremental backups back up only the changed data, and more particularly, only back up the data that has changed since the last backup, whether it was a full or incremental backup.

FIG. 1 illustrates a conventional methodology of data archive where the data backup scheme alternates between full backups and one or more incremental backups between each full backup. As shown, the system can initial perform a full backup (e.g., the "$1^{st}$ day") and subsequently perform a number of incremental backups (e.g., "$2^{nd}$ day" through "$7^{th}$ day") before again performing another full backup (e.g., the "$8^{th}$ day"). The scheme shown in FIG. 1 provides highly reliable storage for two reasons. The scheme provide immutability of data in the archive since the full backup is written once and the data cannot be changed until the next full backup while the changed data is added incrementally. Second, the scheme periodically provides full data backups (e.g., every $8^{th}$ day), which effectively minimizes the likelihood of errors. Moreover, even if error occurs during creation of one of the incremental backups, the next full backup will check validity of data on the source, and a corrected version of data will be recorded into the archive.

However, the data backup scheme shown in FIG. 1 also has disadvantages. For example, this scheme is very time consuming since the immutable data must be written to archive time and time again, i.e., every time full backup is performed regardless of whether data is changed or not. Moreover, when such schemes are used for large organizations, for example, the data backup is scheduled for a so-called backup window that is usually in low load hours (off-peek) of equipment and networks. However, since the process can be very time consuming a full backup usually does not fit within allocated backup window. On the other hand, incremental backups are made relatively quickly (usually—a few minutes) and, therefore, amortization of the dedicated backup window is very small, maybe a few percent. Thus, the rest of the time is wasted, although the company during a given backup window is forced to suspend some processes, temporarily stop the services, and the like.

To address some of the issues encountered by the scheme shown in FIG. 1, many organizations may use a full incremental backup scheme as shown in FIGS. 2A through 2C. For example, using this scheme as shown in FIG. 2A, a full backup is performed only once and all subsequent backups are made incrementally. Thus, to restore the data from such archive, the system must access the initial full backup as well as the whole chain of incremental backups.

In practice, the full incremental data backup scheme shown in FIG. 2A scheme often gradually develops to a point where a portion of the data (e.g., data from the initial full backup) becomes unnecessary since such data may be removed from the source medium. As a result, certain sectors or spaces related to the initial full backup may be freed, so the subsequent incremental backups part of the newly added data will be "inside" the initial full backup. For example, as shown in FIG. 2B, the third incremental data backup may be able to occupy a space of the full backup that has otherwise become vacant space as containing unused and/or removed data.

FIG. 2C illustrates an even more complicated variation of the incremental data backup scheme shown in FIG. 2B. For example, in certain circumstances, data from initial or prior incremental backups may also become partly unnecessary so the newly copied data can occupy the space of the unused incremental backup in the archive (e.g., the $4^{th}$ incremental backup shown in FIG. 2C. As a result, these type of data archive scheme result in data archive that becomes less and less reliable since the data continues to be partially deleted and overwritten (i.e., broken immutability) and regular re-backup are not performed.

SUMMARY

Thus, the present disclosure provides an effective solution for partially validating data archive for incremental format of backup archive. According to an exemplary aspect, a method is provided for validating a backup data file. According to this aspect, the method includes generating, by a processor, the backup data file of electronic data stored in at least one electronic memory by transferring the electronic data to a data storage; generating, by the processor, initial incremental backup data of the electronic data, the initial incremental backup data corresponding to changes made to the electronic data after the backup data file is generated; during the generating of the initial incremental backup data, comparing a first portion of the backup data file with a corresponding first portion of the electronic data stored in the at least one electronic memory; determining, by the processor, whether the first portion of the backup data file is valid based on the comparison of the first portion of the backup data file with the corresponding first portion of the electronic data; and if the first portion of the backup data file is determined to be invalid, generating another backup of the first portion of the electronic data.

According to another aspect, the performing of another backup of the first portion of the electronic data is performed by transferring the corresponding first portion of the electronic data to the data storage and replacing the first portion of the backup data with the corresponding first portion of the electronic data.

According to another aspect, the determining of whether the first portion of the backup data file is valid comprises comparing a checksum of the first portion of the backup data file with a corresponding checksum of the first portion of the electronic data stored in the at least one electronic memory.

According to another aspect, the method includes generating a second backup data file of the electronic data stored in the at least one electronic memory if the backup data file is determined to be invalid; and replacing the backup data file in the data storage with the second backup data file.

According to another aspect, the method includes sequentially generating, by the processor, additional incremental backup data of the electronic data if the backup data file is determined to be valid, the additional incremental backup data corresponding to changes made to the electronic data after the initial incremental backup data of the electronic data is generated.

According to another aspect, the method includes during the generating of the additional incremental backup data, comparing a second portion of the backup data file, different than the first portion, with a corresponding second portion of the electronic data stored in the at least one electronic memory; determining, by the processor, whether the second portion of the backup data file is valid based on the comparison of the second portion of the backup data file with the corresponding second portion of the electronic data; and if the second portion of the backup data file is determined to be invalid, generating another backup of the second portion of the electronic data.

According to another aspect, the method includes continuously generating further incremental backup data of the electronic data and comparing further portions of the backup data file with corresponding further portions of the electronic data, respectively, until all portions of the backup data file have been compared to determine whether each portion of the backup data file is valid.

According to one exemplary aspect, a system is provided for validating a backup data file. In this aspect, the system includes a data storage; at least one electronic memory configured to store electronic data; and a processor communicatively coupled to the at least one electronic memory and configured to generate the backup data file of the electronic data stored in the at least one electronic memory by transferring the electronic data to the data storage; generate initial incremental backup data of the electronic data, the initial incremental backup data corresponding to changes made to the electronic data after the backup data file is generated; during the generating of the initial incremental backup data, compare a first portion of the backup data file with a corresponding first portion of the electronic data stored in the at least one electronic memory; determine whether the first portion of the backup data file is valid based on the comparison of the first portion of the backup data file with the corresponding first portion of the electronic data; and if the first portion of the backup data file is determined to be invalid, generate another backup of the first portion of the electronic data.

According to another aspect, a non-transitory computer readable medium storing computer executable instructions is disclosed for validating a backup data file. According to this aspect, the instructions include generating the backup data file of electronic data stored in at least one electronic memory by transferring the electronic data to a data storage; generating initial incremental backup data of the electronic data, the initial incremental backup data corresponding to changes made to the electronic data after the backup data file is generated; during the generating of the initial incremental backup data, comparing a first portion of the backup data file with a corresponding first portion of the electronic data stored in the at least one electronic memory; determining whether the first portion of the backup data file is valid based on the comparison of the first portion of the backup data file with the corresponding first portion of the electronic data; and if the first portion of the backup data file is determined to be invalid, generating another backup of the first portion of the electronic data.

The above-simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
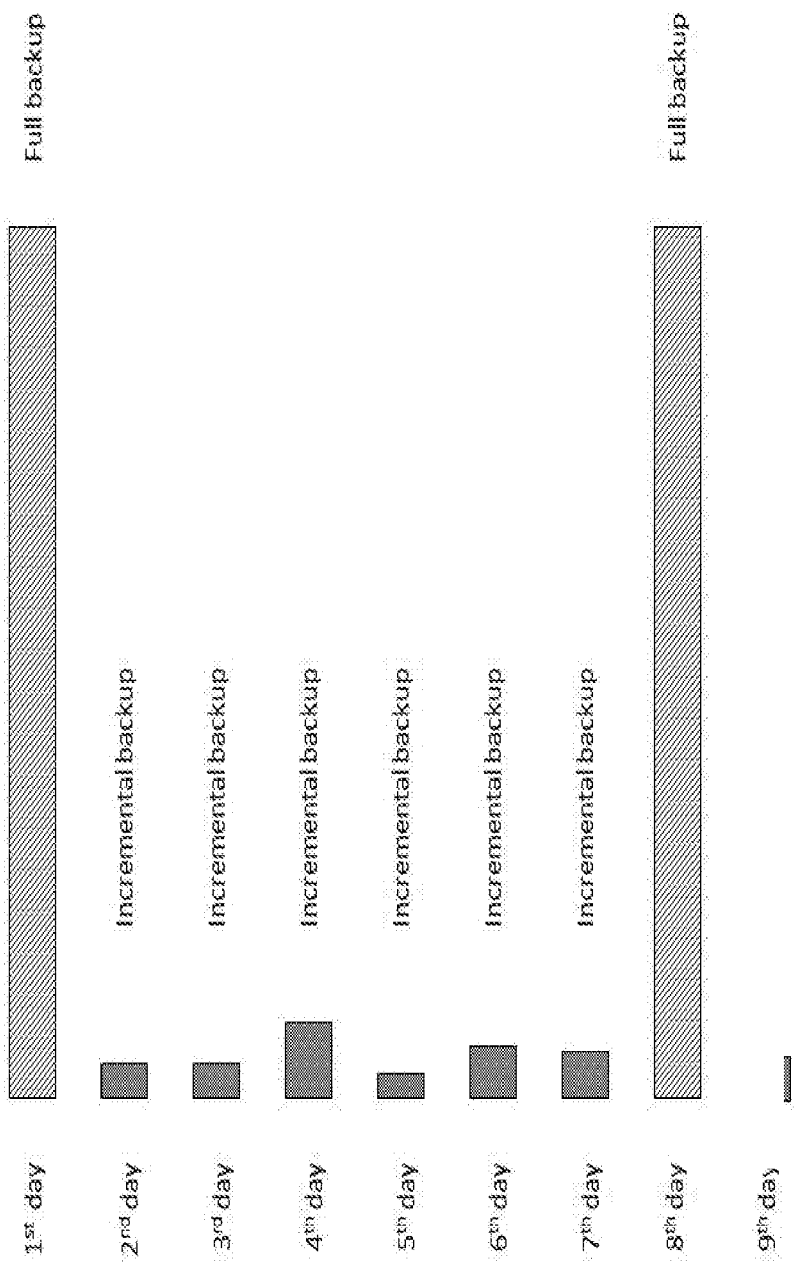
FIG. 1 illustrates a conventional methodology of data archive where the data backup scheme alternates between full backups and one or more incremental backups between each full backup.
Figure 2A:
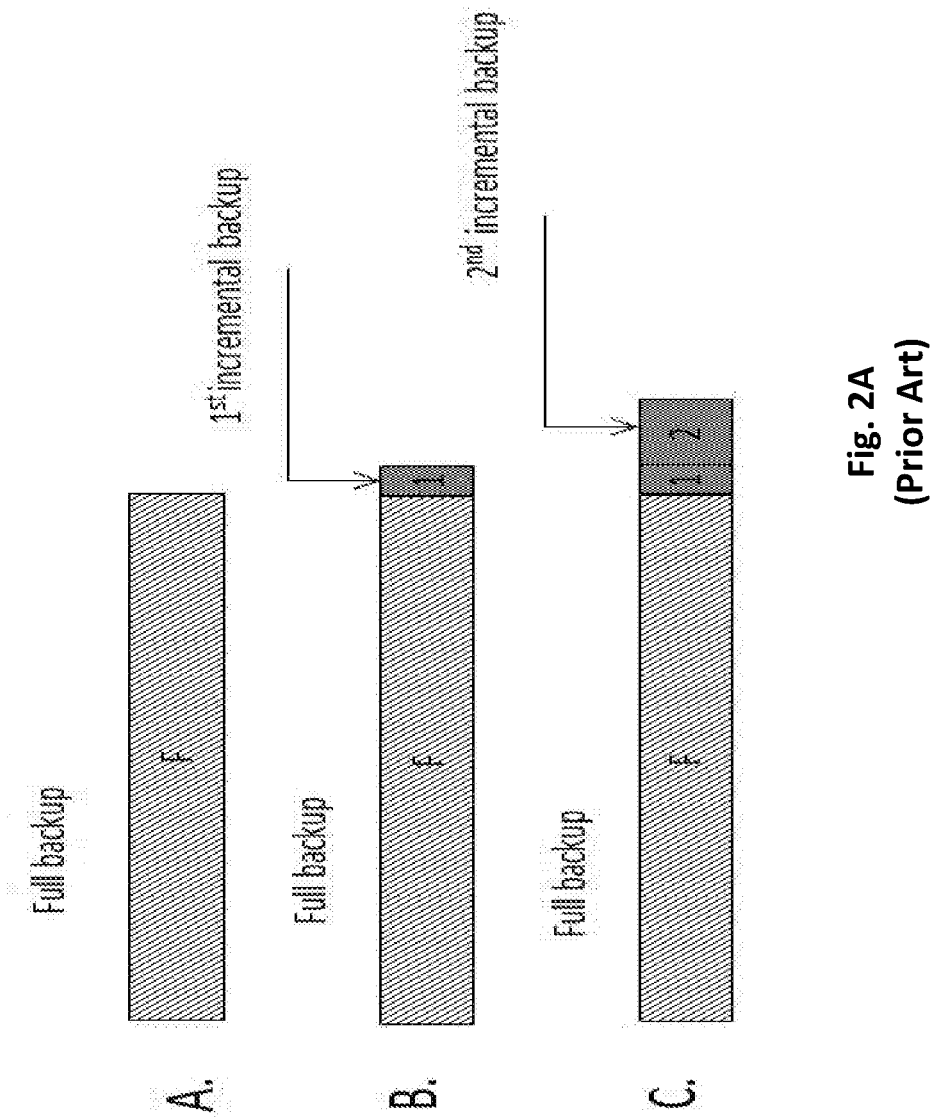
FIGS. 2A to 2C illustrate another conventional methodology of data archive.
Figure 2B:
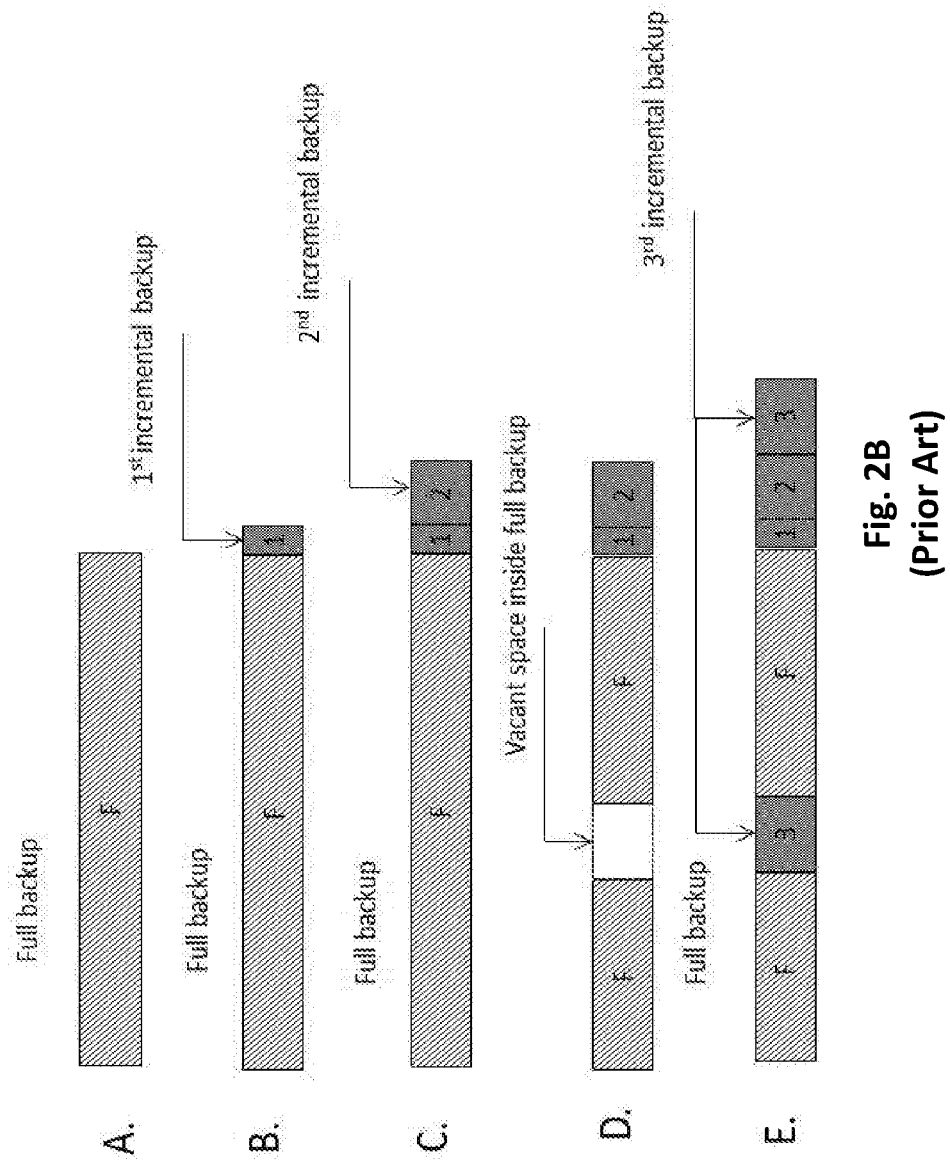
Figure 2C:
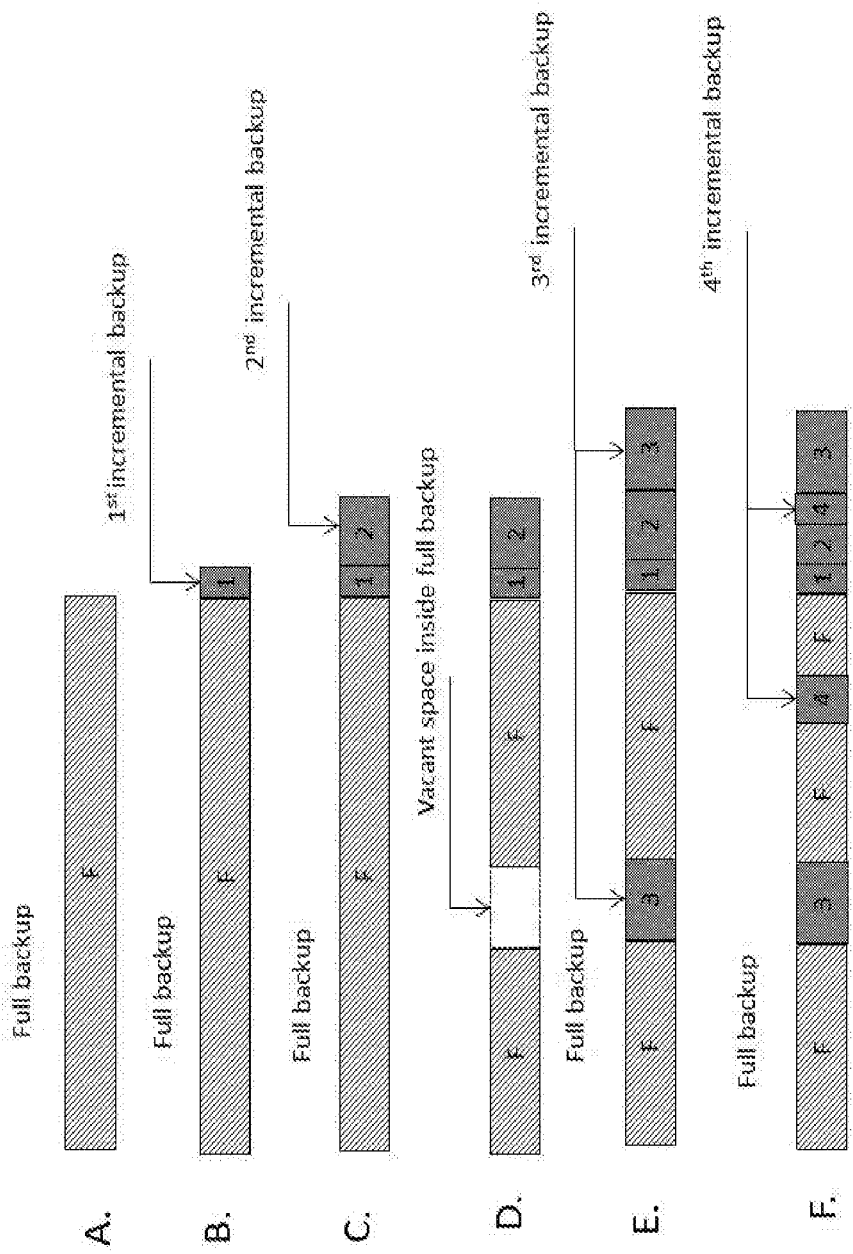

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described herein, a method and system is disclosed for managing aspects of data storage on a file storage system. According to an exemplary aspect, the file storage system can be implemented as an online and/or remote file storage service or cloud computing service. Examples of such cloud base storage services include Amazon® Simple Storage Service ("S3"), and Microsoft® Azure ("Azure"). As will be appreciated herein, the method and system provides an efficient mechanism for creating and managing data files, which can allow individuals and organizational entities to limit, at least to some extent, the increase of data storage costs while ensuring the storage of valid and accurate backup data.

In general, companies such as Microsoft® and Amazon® set up networks and infrastructure to provide one or more multi-client services (such as various types of cloud-based storage) that are accessible via the Internet and/or other networks to a distributed set of clients in a company, organization or the like. These data storage companies will herein be referred to as storage service providers. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

In view of the existing backup schemes described above, FIG. 3 illustrates a block diagram of a system 100 for partially validating data archive for an incremental data backup scheme according to an exemplary aspect. As shown, the system 100 includes a computer 110, a server 120, remote data storage 130, and network 140. According to an exemplary aspect, it is contemplated that the server 120 and remote data storage 130 collectively form a storage service provider, which can be an online/remote file storage service, such S3 or Azure as described above. According to an alternative aspect, the server 120 and remote data storage 130 can collectively form any type of backup server configured to back up and restore files, folders, databases and hard drives on a network 140 in order to prevent the loss of data in the event of a hard drive failure, user error, disaster or accident. For example, the data backup system 100 may be implemented internally by an organization entity, for example.

According to the exemplary aspect, the remote data storage 130 includes hardware and software components configured to manage various storage resources within the computing environment. For example, the remote data storage 130 can include one or more data storage devices 132 (e.g., hard disk drives, optical drives, magnetic tape drives and/or the like) and storage management software (e.g., storage management module 134) that provides an interface to the one or more data storage devices 132. The remote data storage 130 facilitates temporary and/or permanent storage of backups of computer data, such as computer data 136. The computer data may be any type of electronic, digital data generated and/or stored by a computer. For example, the computer data 136 can be backup data that represents text data, executable program code, audio, video or image data, or any other type of digital data. The specific algorithms for backing up and validating the data will be described in detail below.

Furthermore, the server 120 can be any type of computing device as known to those skilled in the art that is capable of cooperating with the remote data storage 130 to execute file system operations on the computer data 136. It should be appreciated that while server 120 and remote data storage 130 are described as forming an online/remote file storage service (e.g., a cloud computing service, as noted above, these components can be incorporated into a local area network or the like as should be appreciated to those skilled in the art.

As further shown, the computer 110 is capable of communicating with the storage server 120 and remote data storage 130 via network 140. According to the exemplary aspect, the computer 110 may be any type of computing device, such as a laptop, a desktop, a Personal Digital Assistant (PDA), a tablet, a mobile phone and the like. The specific hardware details of the exemplary computer 110 will be described below with respect to FIG. 6. However, as generally shown in FIG. 1, the computer 110 includes a computer processing unit ("CPU") 112, one or more software applications, including data management module 114, and memory 116. According to the exemplary aspect, the memory can include user data that is the subject of the data backup and validation operations described herein. Although the data is described as residing on a single computer (e.g., computer 110), the data can reside on multiple computers include or different than computer 110.

Furthermore, according to one aspect, the data management module 114 includes software code (e.g., processor executable instructions) in memory, which may be configured to execute/facilitate the data backup and validation algorithm described here. For example, the CPU 112 of the computer 110 can be configured to execute the data management module 114 to determine one or more file system operations that create and manage computer files of computer data according to data backup schemes disclosed herein. It should be appreciated that while the exemplary aspect of FIG. 1 illustrates that computer 110 includes the data management module 114 to perform the data backup and data validation operations, it is contemplated that data management module 114 can be implemented on server 120 and/or remote data storage 130, according to an alternative aspect. In addition, while the exemplary algorithm disclosed herein is described as being executed primarily (or solely) by the data management module 114, it is noted that these functions can also be performed by the storage management module 134 located at the remote data storage 130 and/or in performed by a combination of the data management module 114 and the storage management module 134 and the storage server 120.

Optionally, the computer 110 can be delegated with the tasks of a file server that facilitates access and management to the backup computer data 136. For example, the computer data 136 can be organized as a distributed file system. Accordingly, the data management module 114 can generate one or more log directory records for execution on the computer data 136 and storage and validation on disk, i.e., within the remote data storage 130 as discussed in more detail below. Alternatively, the server 120 can cooperate with the computer 110 to perform various data storage and validation operations according to the exemplary aspect.

Furthermore, network 140 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 140 may employ various well-known protocols to communicate information amongst the network resources. In one aspect, the network 140 can be part of the Internet or intranet using various communications infrastructure such as Ethernet, WiFi and the like.

According to an exemplary aspect, the computer 110 is configured to facilitate a plurality of file system operations to optimize file storage for computer data stored on memory 116. In particular, these operations can include the generating of an initial backup of user data on memory 116 and then subsequently performing additional incremental data backups of that user data. According to one aspect, the incremental backups are only blocks or sectors of data that represent changed data of the user (e.g., file modifications, deletions, and the like). Furthermore, the incremental data backups only back up the data that has changed since the last backup, whether it was a full or a prior incremental backup.

Figure 3:
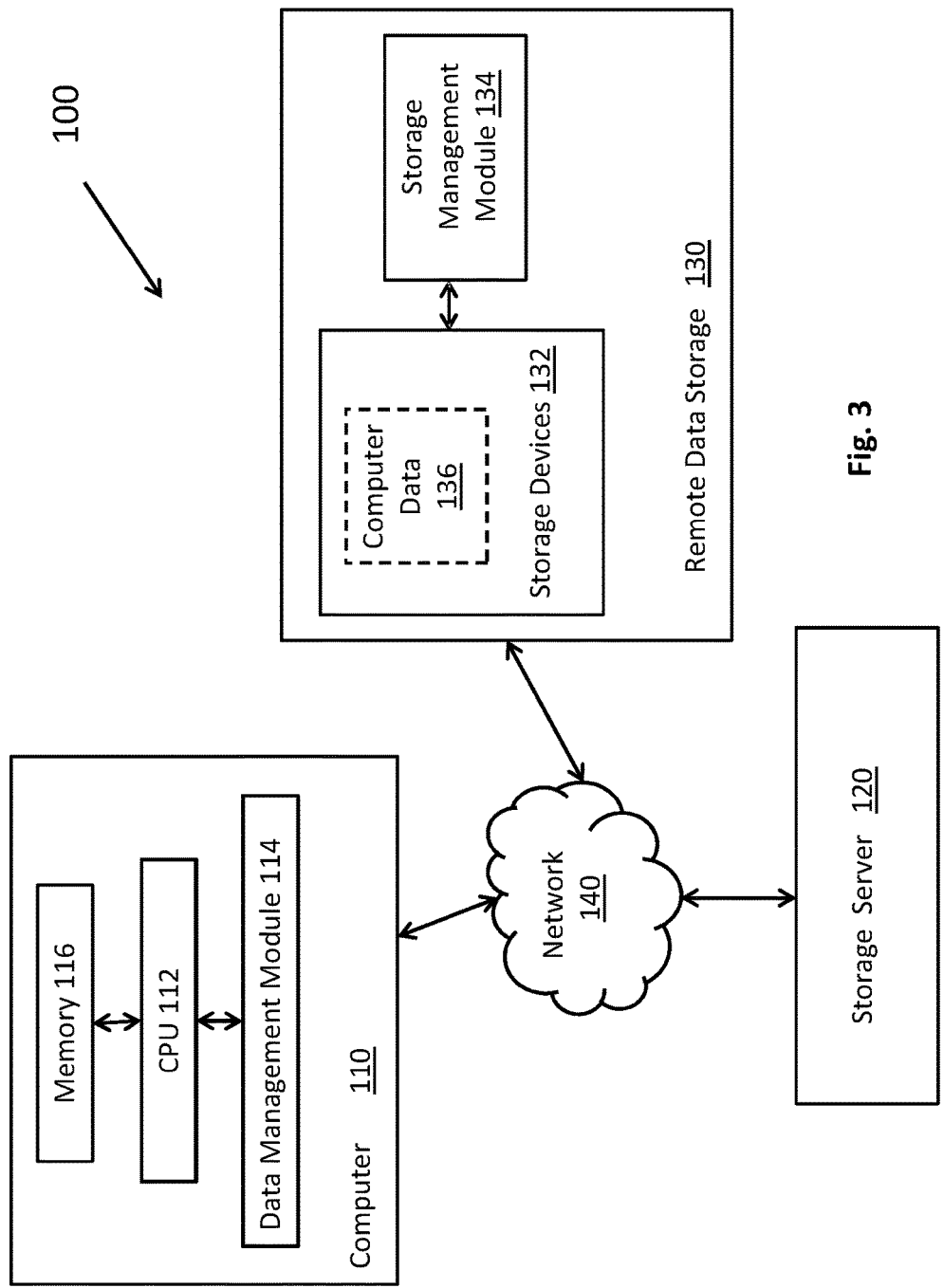
FIG. 3 illustrates a block diagram of a system 100 for partially validating data archive for an incremental data backup scheme according to an exemplary aspect.
Figure 4:
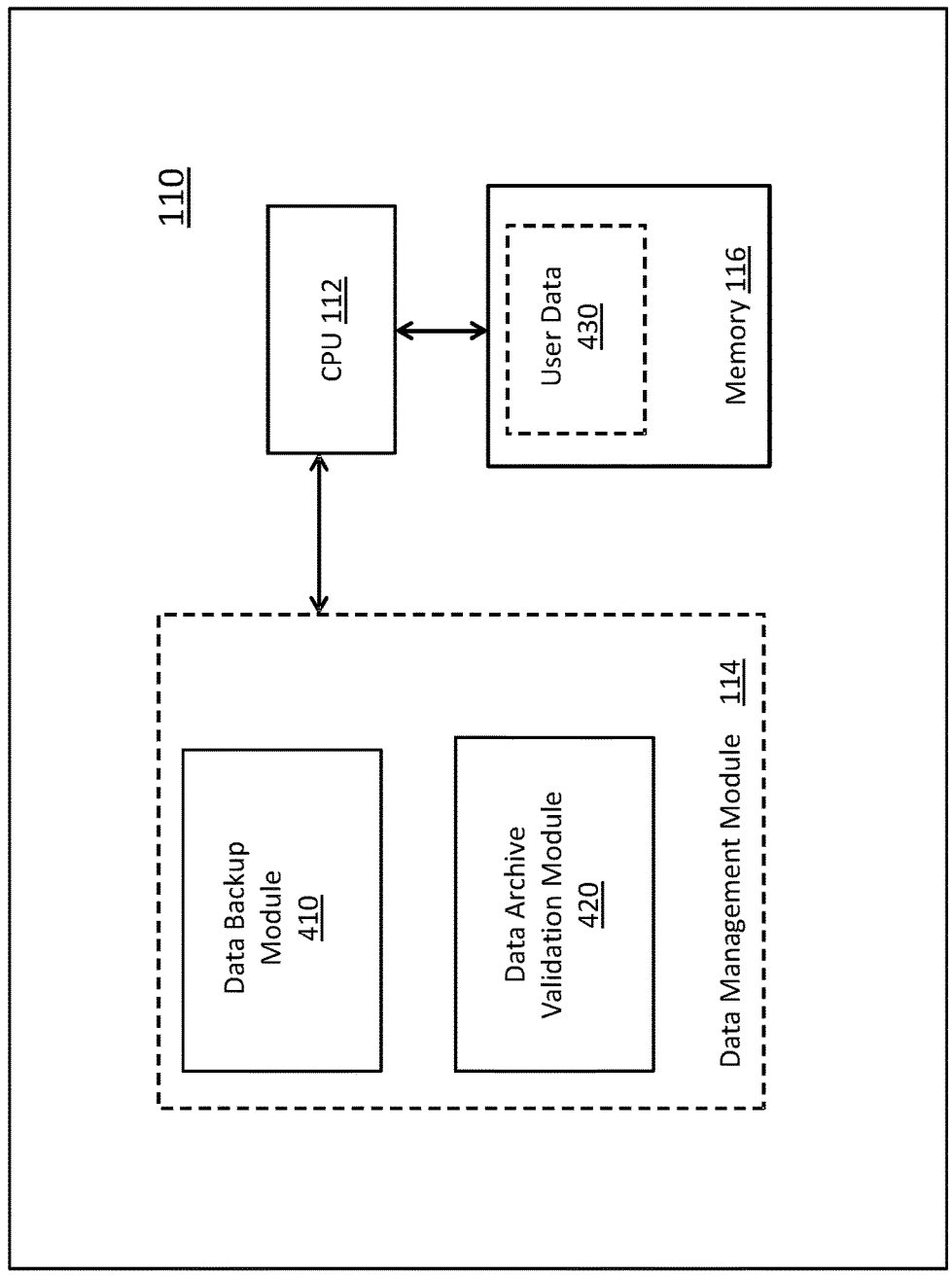
FIG. 4 illustrates a block diagram of a client computer for data backup and data validation operations according to an exemplary aspect.

FIG. 4 illustrates a block diagram of a client computer for data backup and data validation operations according to an exemplary aspect. In particular, the client computer shown in FIG. 4 illustrates a more detailed view of the client computer 110 of system 100 described above with respect to FIG. 3.

As noted above, the client computer 110 includes a data management module 114 that is configured to perform data backup and data validation operations according to the exemplary scheme described herein. According to the exemplary aspect, the data management module 114 can be composed of a plurality of modules. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown in FIG. 4, the data management module 114 can include data backup module 410 and data archive validation module 420. According to the exemplary aspect, the data backup module 410 is configured to initiate and control the data backup process of user data 430 stored on memory 116. Specifically, the data backup module 410 is configured to generate instructions to user data 430 to upload files of user data 430, representing a full data backup file, to a data storage system or facility, such as remote data storage 130. In addition, the data backup module 410 is configured to generate incremental data backups as will be described in more detail below with respect to the algorithm illustrated in FIGS. 5A and 5B.

Furthermore, the data archive validation module 420 is configured to validate portions of the full back of data stored on the data storage system or facility after it is generated by the data backup module 410. In particular, as described in detail below, the data archive validation module 420 is configured to divide the full backup file into a plurality of portions and compare these portions of the backup file with corresponding portions of the original file to validate the backup data. According to one exemplary aspect, the data archive validation module 420 validates the backup date by comparing a checksum (e.g., a hash-sum) of the portion of the original file (e.g., user data 430 of FIG. 4) with a checksum of the corresponding portion of the full backup data file (e.g., the first portion of the full backup).

Figure 5A:
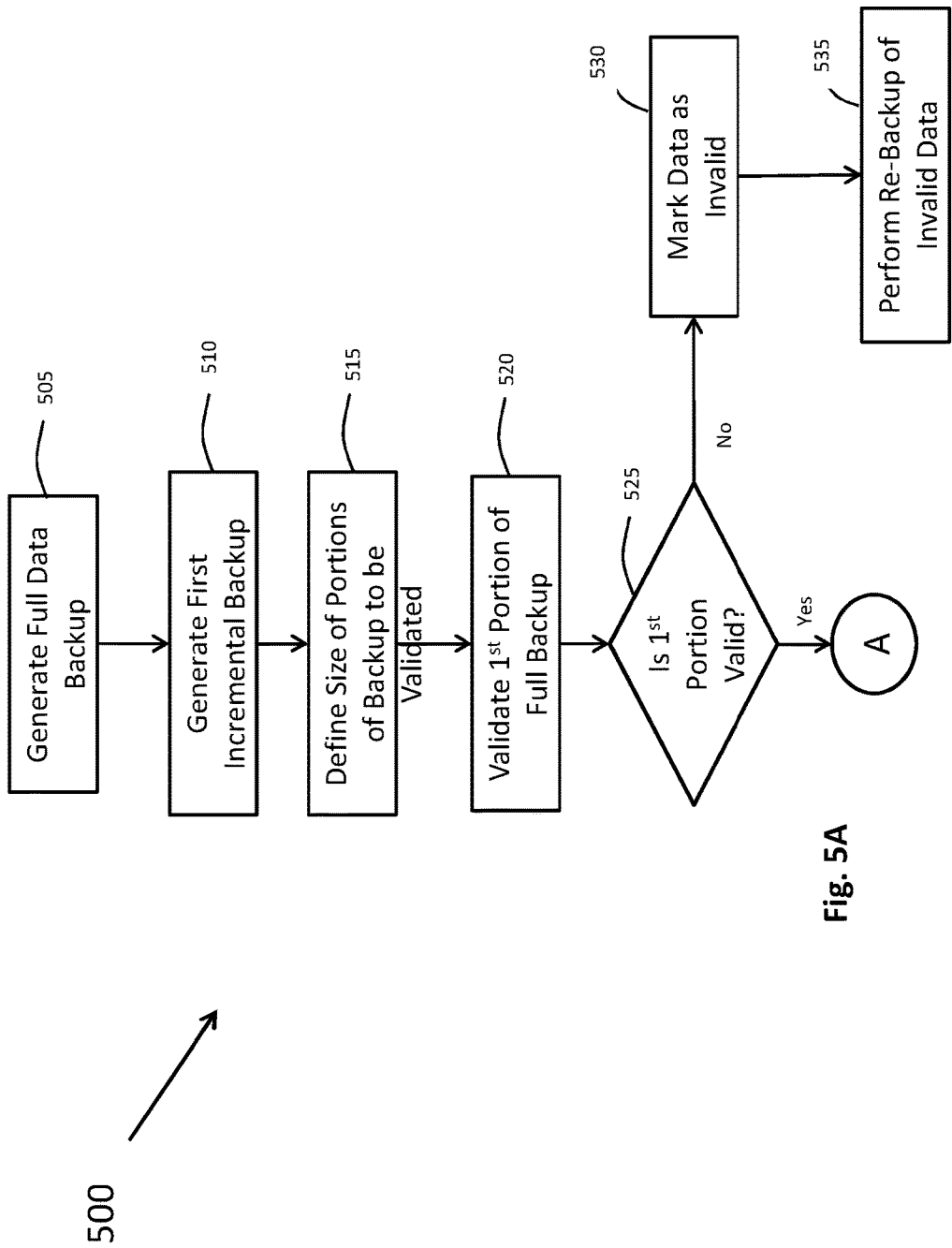
FIGS. 5A and 5B illustrate a method 500 of partially validating data archive for an incremental data backup scheme according to an exemplary aspect.
Figure 5B:
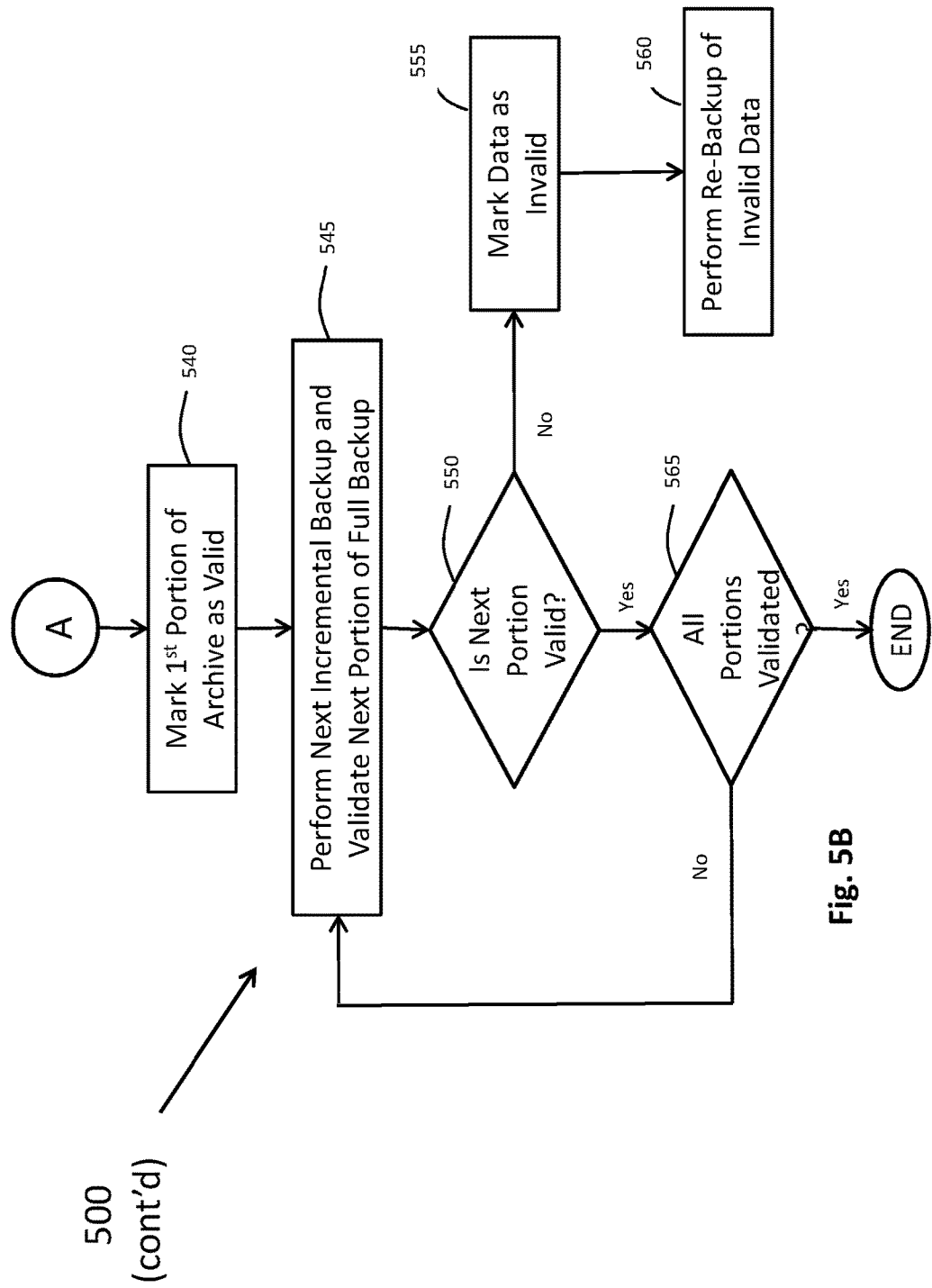

The details of the data backup schemed disclosed herein will now be described. In particular, FIGS. 5A and 5B illustrate a method 500 of partially validating data archive for an incremental data backup scheme according to an exemplary aspect. The method or algorithm shown in FIGS. 5A and 5B can be executed by the data management module 114, and, more particularly, by the data backup module 310 and data archive validation module 320 according to an exemplary aspect.

Initially, as shown as step 505, a full data backup can be generated for data (e.g., user data 430 of FIG. 4) stored in electronic memory (e.g., memory 116 of computer 110). As described above, step 505 can entail data backup module 410 controlling the transfer of data from a computer (or plurality of computers) to a data storage location, such as remote data storage 130, for example.

Next, at step 510, the data backup module 410 generates a first incremental backup of the data (e.g., user data 430 of FIG. 4) that was previously backed up at step 505. According to an exemplary aspect, the first incremental backup of data is performed after a predetermined period of time (e.g., 1 day, 2 days, etc.) and the incremental data is stored with the initial full backup of data at the storage location according to the exemplary aspect. As further described, the incremental data only contains data relating to changes and modifications of the data (e.g., user data 430 of FIG. 4) being backed up. Then, at step 515, the data management module 114, and, more particularly, the data archive validation module 420, defines sizes of portions or sectors of the full backup data file to be validated. For example, the size may be based on dividing the total size of the full backup into an equal number of portions (e.g., 1/10 the total volume). In other words, if the total size of the full backup is 1 gigabyte, the size of the portion to be validated can be 100 megabytes. That is, the data archive validation module 420 can determine the total size of the full backup using known methods and divide this total size by a predetermined number or a number set by a system administrator (e.g., "10"), to determine the total size of each portion of the full backup file (including the first portion) to be validated. Moreover, it should be appreciated that while each portion of the full backup is the same size according to the exemplary aspect, these portions can be varying sizes according to an alternative aspect as should be appreciated.

As further shown, at step 520, the data management module 114, and more particularly, the data archive validation module 420 will initiate the validation or testing of the data integrity of the full data backup generated for the data (e.g., user data 430 of FIG. 4). In particular, the data validation is performed to ensure the safety and absence of any data damage. Although steps 510 and 520 are shown in sequence, it should be appreciated that according to the exemplary aspect, the validation of the first portion of the full backup will be performed concurrently with the generation of the first incremental backup. In other words, at the time when the data backup module 410 is generating the first incremental backup of the data 430, the data archive validation module 420 is concurrently validating a first portion of the full data backup file. Advantageously, the entity performing the data backup process is fully utilizing or amortizing the backup window.

As shown in step 525, the data management module 114 is configured to determine whether the first portion of the full backup is valid. The validation is performed by the data archive validation module 420 by accessing (or reading) the original data (e.g., user data 430 of FIG. 4) or the relevant portion thereof, and comparing this original data with the corresponding first portion of the full backup that is stored in the data storage (e.g., remote data storage 130). For example, if the user date is 1 gigabyte, the first portion thereof may be the first 100 megabytes, which will be compared with the first 100 megabytes of data that is part of the full backup file. According to one exemplary aspect, the validation performed by the data archive validation module 420 utilizes templates for the comparison process, for example, by comparing a checksum (e.g., a hash-sum) of the portion of the original file (e.g., user data 430 of FIG. 4) with a checksum of the corresponding portion of the full backup data file (e.g., the first portion of the full backup).

As further shown, if during the validation at step 525, the data archive validation module 420 determines that there is damage to the data (e.g., the compared checksums do not match), the method proceeds to step 530 where the data archive validation module 420 marks the first portion of the full backup as "defective" (i.e., invalid or non-consistent) and should be subject to re-backup. Moreover, either at that point or after the full cycle of data validation, the system performs step 535 in which the data backup module 410 performs a re-backup of the invalid data. Preferably, the system is able to identify that portion of original data (e.g., user data 430 of FIG. 4) and replace the corresponding invalid portion (i.e., the specific files or sectors) in the full backup stored in the data storage (e.g., remote data storage 130). Alternatively, if the data archive validation module 420 determines that the validity of the full backup cannot be restored by only performing a re-backup of the specifically marked invalid portion of the backup file, the data backup module 410 can perform a full backup of the original data (e.g., user data 430 of FIG. 4) and optionally replace the initial backup with the new full backup.

Referring back to step 525, if the data archive validation module 420 determines that the first portion of the full backup file is valid (e.g., if the corresponding checksums match), then the method proceeds to step 540 as shown in FIG. 5B. In particular, at step 540, the data archive validation module 420 marks the first portion of the full backup as valid.

As further described above, the system is configured to perform the incremental data back concurrently with the data validation. In other words, according to the exemplary aspect, step 510 is concurrently performed at the same time with at least steps 520-530 and 540. Step 535 can also be performed at this time or at a subsequent time. Advantageously, this scheme, among other things, enables the system to achieve a full amortization of the dedicated backup window, since in a given time interval, both the incremental backup and the validation (in parts) of all data is performed. As such, to a certain extent, the scheme can be considered a substitute for regular re-backup. This makes it possible to talk about tangible improvements in the reliability of "always incremental backup" format.

As further shown in FIG. 5B, the method proceeds to step 545 where the next incremental backup is performed, and concurrently, the next portion of the full backup file is validated. More particularly, the next incremental backup can be performed subsequent to the first incremental backup at step 510 while the data archive validation module 420 concurrently validates the next portion of the full backup at step 550.

Similar to the steps described above, if during the validation at step 550, the data archive validation module 420 determines that there is damage to the data of the next portion of the full backup (e.g., the compared checksum of the next backup does not match the corresponding portion of the full file), the method proceeds to step 555 where the data archive validation module 420 marks the next portion of the full backup as "defective" (i.e., invalid or non-consistent) and should be subject to re-backup. Moreover, either at that point or after the full cycle of data validation, the system performs step 560 in which the data backup module 410 performs a re-backup of the invalid data. Preferably, the system is able to identify that portion of original data (e.g., user data 430 of FIG. 4) and replace the corresponding invalid portion (i.e., the specific files or sectors) in the full backup stored in the data storage (e.g., remote data storage 130). Again, if the data archive validation module 420 determines that the validity of the full backup cannot be restored by only performing a re-backup of the specifically marked invalid portion, the data backup module 410 can perform a full backup of the original data (e.g., user data 430 of FIG. 4) and optionally replace the initial backup with the new full backup.

Referring back to step 550, if the data archive validation module 420 determines that the next portion of the full backup file is valid (e.g., if the corresponding checksums match), the data archive validation module 420 marks this next portion as valid and then proceeds to step 565. In particular, at step 565, the data archive validation module 420 determines whether all portions of the full backup file have been validated. If they have, the method ends. Alternatively, if additional portions need to be validated, the method returns to step 545 and repeats the incremental backup and data validation scheme described above.

This process is repeated for all portions of the backup data file. Moreover, it should be appreciated that according to an exemplary aspect, the system determines the number of the portions of full backup to be validated (e.g., 10 portions) as being equal to the number of data increments generated during one full data backup cycle. Thus, over a 10-minute session where 10 incremental backups will be executed, the system will also divide the full backup file into 10 portions, such that a complete data integrity check of the main (full) backup can be performed. The disclosed system and method is provided to minimize reliability problems that are inherent to the always incremental backup scheme, and at the same time not eliminate the advantages of such data backup scheme.

Figure 6:
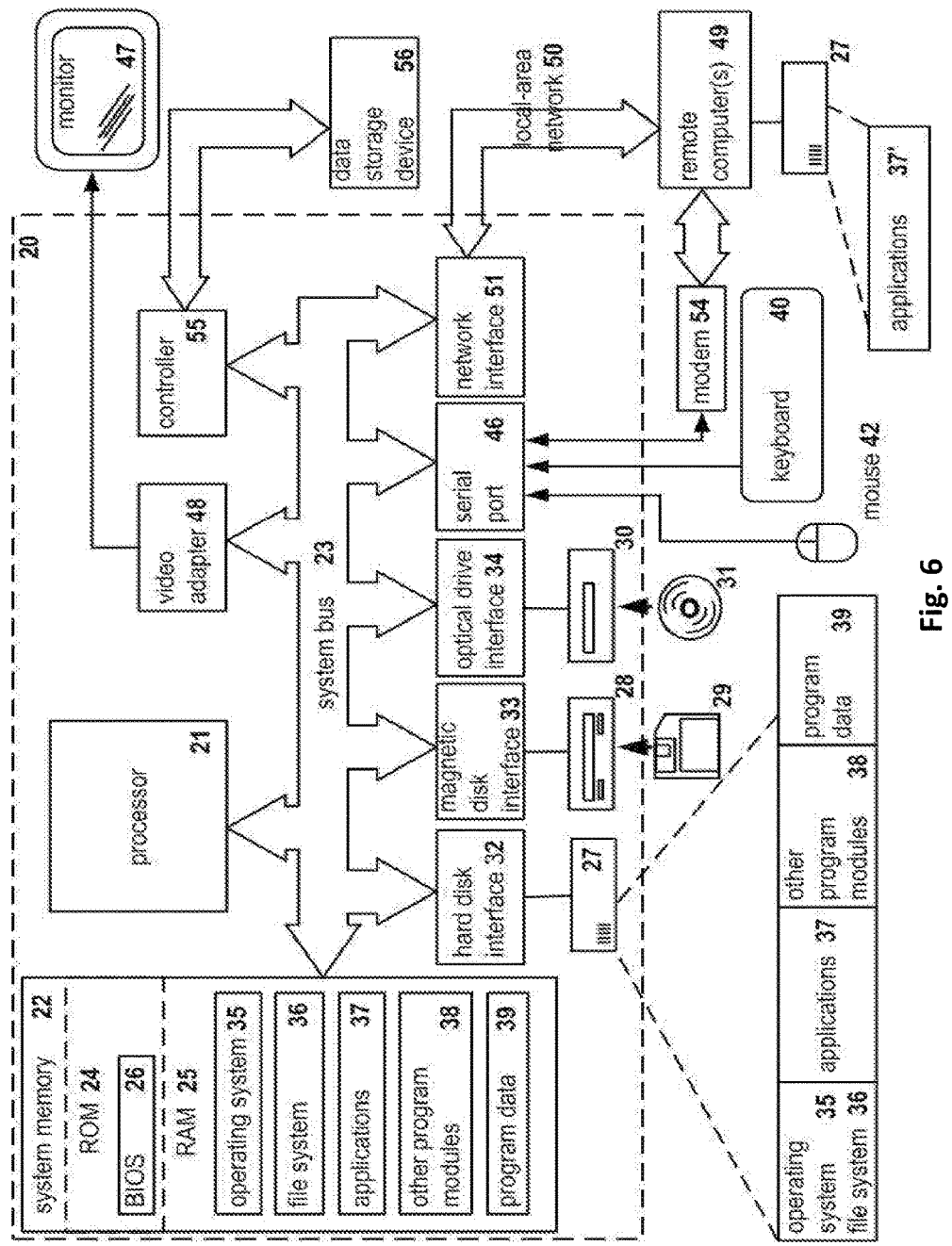
FIG. 6 illustrates an example of a general-purpose computer system on which the disclosed systems and method can be implemented.

Finally, FIG. 6 illustrates an example of a general-purpose computer system (which may be a personal computer or a server) on which the disclosed systems and method can be implemented according to an example aspect. It should be appreciated that the detailed general-purpose computer system can correspond to the computer 110 described above with respect to FIG. 3. Moreover, the remote computer(s) 49, as described below, can correspond to the remote data storage services discussed above with respect to the exemplary system and method.

As shown in FIG. 6, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for validating a backup data file during a backup window, the method comprising:
   generating, by a processor, the backup data file of electronic data stored in at least one electronic memory by transferring the electronic data to a data storage;
   defining, by the processor, the backup data file into a plurality of portions to be validated;
   generating, by the processor, initial incremental backup data of the electronic data, the initial incremental backup data corresponding to changes made to the electronic data after the backup data file is generated;
   concurrently during the generating of the initial incremental backup data, comparing a first portion of the plurality of portions of the backup data file with a corresponding first portion of the electronic data stored in the at least one electronic memory in order to amortize the backup window;
   determining, by the processor, whether the first portion of the backup data file is valid based on the comparison of the first portion of the backup data file with the corresponding first portion of the electronic data; and if the first portion of the backup data file is determined to be invalid, generating another backup of the first portion of the electronic data, wherein a number of the plurality of portions to be validated is equal to a number of incremental backups performed during the backup window.

2. The method of claim 1, wherein the performing of another backup of the first portion of the electronic data is performed by transferring the corresponding first portion of the electronic data to the data storage and replacing the first portion of the backup data with the corresponding first portion of the electronic data.

3. The method of claim 1, wherein the determining of whether the first portion of the backup data file is valid comprises comparing a checksum of the first portion of the backup data file with a corresponding checksum of the first portion of the electronic data stored in the at least one electronic memory.

4. The method of claim 1, further comprising:
generating a second backup data file of the electronic data stored in the at least one electronic memory if the backup data file is determined to be invalid; and
replacing the backup data file in the data storage with the second backup data file.

5. The method of claim 1, further comprising sequentially generating, by the processor, additional incremental backup data of the electronic data if the backup data file is determined to be valid, the additional incremental backup data corresponding to changes made to the electronic data after the initial incremental backup data of the electronic data is generated.

6. The method of claim 5, further comprising:
during the generating of the additional incremental backup data, comparing a second portion of the backup data file, different than the first portion, with a corresponding second portion of the electronic data stored in the at least one electronic memory;
determining, by the processor, whether the second portion of the backup data file is valid based on the comparison of the second portion of the backup data file with the corresponding second portion of the electronic data; and
if the second portion of the backup data file is determined to be invalid, generating another backup of the second portion of the electronic data.

7. The method of claim 6, further comprising continuously generating further incremental backup data of the electronic data and comparing further portions of the backup data file with corresponding further portions of the electronic data, respectively, until all portions of the backup data file have been compared to determine whether each portion of the backup data file is valid.

8. A system for validating a backup data file, the system comprising:
a data storage;
at least one electronic memory configured to store electronic data; and
a processor communicatively coupled to the at least one electronic memory and configured to:
generate the backup data file of the electronic data stored in the at least one electronic memory by transferring the electronic data to the data storage;
define the backup data file into a plurality of portions to be validated;
generate initial incremental backup data of the electronic data, the initial incremental backup data corresponding to changes made to the electronic data after the backup data file is generated;
concurrently during the generating of the initial incremental backup data, compare a first portion of the plurality of portions of the backup data file with a corresponding first portion of the electronic data stored in the at least one electronic memory in order to amortize the backup window;
determine whether the first portion of the backup data file is valid based on the comparison of the first portion of the backup data file with the corresponding first portion of the electronic data; and
if the first portion of the backup data file is determined to be invalid, generate another backup of the first portion of the electronic data,
wherein a number of the plurality of portions to be validated is equal to a number of incremental backups performed during the backup window.

9. The system of claim 8, wherein the processor is configured to generate the another backup of the first portion of the electronic data by transferring the corresponding first portion of the electronic data to the data storage and replacing the first portion of the backup data with the corresponding first portion of the electronic data.

10. The system of claim 8, wherein the processor is configured to determine whether the first portion of the backup data file is valid by comparing a checksum of the first portion of the backup data file with a corresponding checksum of the first portion of the electronic data stored in the at least one electronic memory.

11. The system of claim 8, wherein the processor is further configured to:
generate a second backup data file of the electronic data stored in the at least one electronic memory if the backup data file is determined to be invalid; and
replace the backup data file in the data storage with the second backup data file.

12. The system of claim 8, wherein the processor is further configured to sequentially generate additional incremental backup data of the electronic data if the backup data file is determined to be valid, wherein the additional incremental backup data corresponds to changes made to the electronic data after the initial incremental backup data of the electronic data is generated.

13. The system of claim 12, wherein the processor is further configured to:
during the generating of the additional incremental backup data, compare a second portion of the backup data file, different than the first portion, with a corresponding second portion of the electronic data stored in the at least one electronic memory,
determine whether the second portion of the backup data file is valid based on the comparison of the second portion of the backup data file with the corresponding second portion of the electronic data; and
if the second portion of the backup data file is determined to be invalid, generate another backup of the second portion of the electronic data.

14. The system of claim 13, wherein the processor is further configured to continuously generate further incremental backup data of the electronic data and comparing further portions of the backup data file with corresponding further portions of the electronic data, respectively, until all portions of the backup data file have been compared to determine whether each portion of the backup data file is valid.

15. A non-transitory computer readable medium storing computer executable instructions for validating a backup data file, including instructions for:
- generating the backup data file of electronic data stored in at least one electronic memory by transferring the electronic data to a data storage;
- defining the backup data file into a plurality of portions to be validated;
- generating initial incremental backup data of the electronic data, the initial incremental backup data corresponding to changes made to the electronic data after the backup data file is generated;
- concurrently during the generating of the initial incremental backup data, comparing a first portion of the plurality of portions of the backup data file with a corresponding first portion of the electronic data stored in the at least one electronic memory in order to amortize the backup window;
- determining whether the first portion of the backup data file is valid based on the comparison of the first portion of the backup data file with the corresponding first portion of the electronic data; and
- if the first portion of the backup data file is determined to be invalid, generating another backup of the first portion of the electronic data,
- wherein a number of the plurality of portions to be validated is equal to a number of incremental backups performed during the backup window.

16. The non-transitory computer readable medium of claim 15, wherein the performing of another backup of the first portion of the electronic data is performed by transferring the corresponding first portion of the electronic data to the data storage and replacing the first portion of the backup data with the corresponding first portion of the electronic data.

17. The non-transitory computer readable medium of claim 15, wherein the determining of whether the first portion of the backup data file is valid comprises comparing a checksum of the first portion of the backup data file with a corresponding checksum of the first portion of the electronic data stored in the at least one electronic memory.

18. The non-transitory computer readable medium of claim 15, further comprising instructions for:
- generating a second backup data file of the electronic data stored in the at least one electronic memory if the backup data file is determined to be invalid; and
- replacing the backup data file in the data storage with the second backup data file.

19. The non-transitory computer readable medium of claim 15, further comprising instructions for sequentially generating additional incremental backup data of the electronic data if the backup data file is determined to be valid, the additional incremental backup data corresponding to changes made to the electronic data after the initial incremental backup data of the electronic data is generated.

20. The non-transitory computer readable medium of claim 19, further comprising instructions for:
- during the generating of the additional incremental backup data, comparing a second portion of the backup data file, different than the first portion, with a corresponding second portion of the electronic data stored in the at least one electronic memory;
- determining whether the second portion of the backup data file is valid based on the comparison of the second portion of the backup data file with the corresponding second portion of the electronic data; and
- if the second portion of the backup data file is determined to be invalid, generating another backup of the second portion of the electronic data.

21. The non-transitory computer readable medium of claim 20, further comprising instructions for continuously generating further incremental backup data of the electronic data and comparing further portions of the backup data file with corresponding further portions of the electronic data, respectively, until all portions of the backup data file have been compared to determine whether each portion of the backup data file is valid.

* * * * *